(12) United States Patent
Robichaud et al.

(10) Patent No.: US 10,755,702 B2
(45) Date of Patent: Aug. 25, 2020

(54) MULTIPLE PARALLEL DIALOGS IN SMART PHONE APPLICATIONS

(71) Applicant: Nuance Communications, Inc., Burlington, MA (US)

(72) Inventors: Jean-Phillipe Robichaud, Mercier (CA); Matthieu Hebert, Melocheville (CA)

(73) Assignee: Nuance Communications, Inc., Burlington, MA (US)

( * ) Notice: Subject to any disclaimer, the term of this patent is extended or adjusted under 35 U.S.C. 154(b) by 116 days.

(21) Appl. No.: 15/215,956

(22) Filed: Jul. 21, 2016

(65) Prior Publication Data

US 2017/0011744 A1 Jan. 12, 2017

Related U.S. Application Data

(63) Continuation of application No. 13/904,269, filed on May 29, 2013, now Pat. No. 9,431,008.

(51) Int. Cl.
| | |
|---|---|
| *G10L 15/22* | (2006.01) |
| *G10L 15/18* | (2013.01) |
| *G06F 3/0481* | (2013.01) |
| *G06F 3/0482* | (2013.01) |

(Continued)

(52) U.S. Cl.
CPC ............ *G10L 15/22* (2013.01); *G06F 3/0482* (2013.01); *G06F 3/04817* (2013.01); *G10L 15/18* (2013.01); *G10L 15/1815* (2013.01); *G10L 15/30* (2013.01); *G06F 3/167* (2013.01);

(Continued)

(58) Field of Classification Search
CPC ... G10L 15/22; G10L 15/183; G10L 15/1822; G10L 15/19; G10L 15/193
See application file for complete search history.

(56) References Cited

U.S. PATENT DOCUMENTS

| | | | |
|---|---|---|---|
| 5,615,296 A | 3/1997 | Stanford et al. |
| 5,651,096 A | 7/1997 | Pallakoff et al. |
| 5,774,860 A | 6/1998 | Bayya et al. |

(Continued)

OTHER PUBLICATIONS

Lin, Bor-shen, Hsin-min Wang, and Lin-shan Lee. "A distributed architecture for cooperative spoken dialogue agents with coherent dialogue state and history."Asru. vol. 99. 1999.

(Continued)

*Primary Examiner* — Fariba Sirjani
(74) *Attorney, Agent, or Firm* — Brian J. Colandreo; Michael T. Abramson; Holland & Knight LLP (57) ABSTRACT

An arrangement is described for conducting natural language dialogs with a user on a mobile device using automatic speech recognition (ASR) and multiple different dialog applications. A user interface provides for user interaction with the dialogue applications in natural language dialogs. An ASR engine processes unknown speech inputs from the user to produce corresponding speech recognition results. A dialog concept module develops dialog concept items from the speech recognition results and stores the dialog concept items and additional dialog information in a dialog concept database. A dialog processor accesses dialog concept database information and coordinates operation of the ASR engine and the dialog applications to conduct with the user a plurality of separate parallel natural language dialogs in the dialog applications.

20 Claims, 8 Drawing Sheets

(51) Int. Cl.
*G10L 15/30* (2013.01)
*G06F 3/16* (2006.01)

(52) U.S. Cl.
CPC .. *G10L 2015/223* (2013.01); *G10L 2015/225* (2013.01); *G10L 2015/228* (2013.01)

(56) References Cited

U.S. PATENT DOCUMENTS

| | | |
|---|---|---|
| 5,794,189 A | 8/1998 | Gould |
| 5,873,107 A | 2/1999 | Borovoy et al. |
| 6,167,377 A | 12/2000 | Gillick et al. |
| 6,173,266 B1 | 1/2001 | Marx et al. |
| 6,201,540 B1 * | 3/2001 | Gallup ............... B60K 35/00 715/764 |
| 6,233,559 B1 | 5/2001 | Balakrishnan |
| 6,311,159 B1 | 10/2001 | Van Tichelen et al. |
| 6,418,440 B1 | 7/2002 | Kuo et al. |
| 6,970,935 B1 | 11/2005 | Maes |
| 7,016,847 B1 | 3/2006 | Tessel et al. |
| 7,069,254 B2 | 6/2006 | Foulger et al. |
| 7,137,126 B1 | 11/2006 | Coffman et al. |
| 7,206,747 B1 | 4/2007 | Morgan et al. |
| 7,224,346 B2 | 5/2007 | Sheng |
| 7,451,152 B2 | 11/2008 | Kraft et al. |
| 7,512,904 B2 | 3/2009 | Matthews et al. |
| 7,555,713 B2 | 6/2009 | Yang |
| 7,562,082 B2 | 7/2009 | Zhou |
| 7,599,915 B2 | 10/2009 | Hill et al. |
| 7,676,517 B2 | 3/2010 | Hurst-Hiller et al. |
| 7,774,713 B2 | 8/2010 | Mital et al. |
| 7,953,730 B1 | 5/2011 | Bleckner et al. |
| 8,326,622 B2 | 12/2012 | Kraenzel et al. |
| 8,719,034 B2 | 5/2014 | Cross, Jr. et al. |
| 8,959,109 B2 | 2/2015 | Scott et al. |
| 9,043,709 B2 | 5/2015 | Chae et al. |
| 2001/0028368 A1 | 10/2001 | Swartz et al. |
| 2002/0135614 A1 | 9/2002 | Bennett |
| 2002/0140741 A1 | 10/2002 | Felkey et al. |
| 2002/0184023 A1 | 12/2002 | Busayapongchai et al. |
| 2003/0098891 A1 | 5/2003 | Molander |
| 2003/0171928 A1 | 9/2003 | Falcon et al. |
| 2003/0182131 A1 | 9/2003 | Arnold et al. |
| 2003/0191627 A1 | 10/2003 | Au |
| 2004/0166832 A1 | 8/2004 | Portman et al. |
| 2004/0215649 A1 | 10/2004 | Whalen et al. |
| 2005/0033582 A1 | 2/2005 | Gadd et al. |
| 2005/0080625 A1 | 4/2005 | Bennett et al. |
| 2005/0120306 A1 | 6/2005 | Klassen et al. |
| 2005/0192804 A1 | 9/2005 | Kitagawa et al. |
| 2006/0053016 A1 | 3/2006 | Falcon et al. |
| 2007/0033005 A1 | 2/2007 | Cristo et al. |
| 2007/0050191 A1 | 3/2007 | Weider et al. |
| 2007/0061148 A1 | 3/2007 | Cross et al. |
| 2008/0048908 A1 | 2/2008 | Sato |
| 2008/0091406 A1 | 4/2008 | Baldwin et al. |
| 2008/0189110 A1 * | 8/2008 | Freeman ............ G06Q 30/0241 704/251 |
| 2009/0150156 A1 | 6/2009 | Kennewick et al. |
| 2010/0146449 A1 | 6/2010 | Brown et al. |
| 2010/0218141 A1 | 8/2010 | Xu et al. |
| 2010/0312547 A1 | 12/2010 | Van Os et al. |
| 2011/0054899 A1 * | 3/2011 | Phillips .................. G10L 15/30 704/235 |
| 2011/0106534 A1 | 5/2011 | LeBeau et al. |
| 2011/0193726 A1 | 8/2011 | Szwabowski et al. |
| 2011/0231798 A1 | 9/2011 | Cok |
| 2011/0246944 A1 | 10/2011 | Byrne et al. |
| 2012/0023524 A1 | 1/2012 | Suk et al. |
| 2012/0078611 A1 * | 3/2012 | Soltani .................... G06F 3/167 704/9 |
| 2012/0131470 A1 * | 5/2012 | Wessling .............. G06F 21/105 715/739 |
| 2012/0185798 A1 | 7/2012 | Louch et al. |
| 2012/0209608 A1 | 8/2012 | Lee |
| 2012/0316871 A1 | 12/2012 | Koll et al. |
| 2013/0054791 A1 | 2/2013 | Oki et al. |
| 2013/0159920 A1 * | 6/2013 | Scott ....................... G06F 17/24 715/780 |
| 2013/0169524 A1 | 7/2013 | Han et al. |
| 2013/0226590 A1 | 8/2013 | Lee |
| 2013/0325460 A1 | 12/2013 | Kim et al. |
| 2013/0346872 A1 * | 12/2013 | Scott ..................... G06F 16/248 715/738 |
| 2014/0095147 A1 | 4/2014 | Hebert et al. |
| 2014/0108019 A1 | 4/2014 | Ehsani et al. |
| 2014/0136183 A1 | 5/2014 | Hebert et al. |
| 2014/0149920 A1 | 5/2014 | Wang et al. |
| 2014/0163959 A1 | 6/2014 | Hebert et al. |
| 2014/0164953 A1 | 6/2014 | Lynch et al. |
| 2014/0173460 A1 * | 6/2014 | Kim ........................ H04L 51/18 715/753 |
| 2014/0189584 A1 | 7/2014 | Weng et al. |
| 2014/0195243 A1 | 7/2014 | Cha et al. |
| 2014/0249821 A1 | 9/2014 | Kennewick et al. |
| 2014/0257793 A1 | 9/2014 | Gandrabur et al. |
| 2014/0278435 A1 | 9/2014 | Ganong, III et al. |
| 2014/0281969 A1 * | 9/2014 | Kumar .................. G06F 3/0482 715/711 |
| 2014/0297268 A1 | 10/2014 | Govrin et al. |
| 2014/0297283 A1 | 10/2014 | Hebert et al. |
| 2014/0358545 A1 | 12/2014 | Robichaud et al. |
| 2015/0066479 A1 | 3/2015 | Pasupalak et al. |
| 2015/0082175 A1 | 3/2015 | Onohara et al. |
| 2015/0160907 A1 | 6/2015 | Zhang et al. |

OTHER PUBLICATIONS

J.E. Kendall et a., "Information Delivery Systems: An Exploration of Web Pull and Push Technologies," Communications of the Association for Information Systems, vol. 1, Art . 14, Apr. 1999.

May 20, 2015 U.S. Non-Final Office Action—U.S. Appl. No. 13/904,269.

Nov. 4, 2015 U.S. Final Office Action—U.S. Appl. No. 13/904,269.

* cited by examiner

*Fig. 1A*

Prior Art

Prior Art

MULTIPLE PARALLEL DIALOGS IN SMART PHONE APPLICATIONS

CROSS-REFERENCE TO RELATED APPLICATIONS

This application is a continuation of U.S. patent application Ser. No. 13/904,269, filed May 29, 2013, titled "Multiple Parallel Dialogs in Smart Phone Applications." Application Ser. No. 13/904,269, in its entirety, is incorporated by reference herein.

TECHNICAL FIELD

The invention generally relates to automatic speech recognition (ASR), and more specifically, to client-server ASR on mobile devices.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\operatorname{argmax}} P(W \mid A)$$

Given a system of statistical acoustic models, this formula can be re-expressed as:

$$\hat{W} = \underset{W}{\operatorname{argmax}} P(W) P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

Figure 1A:
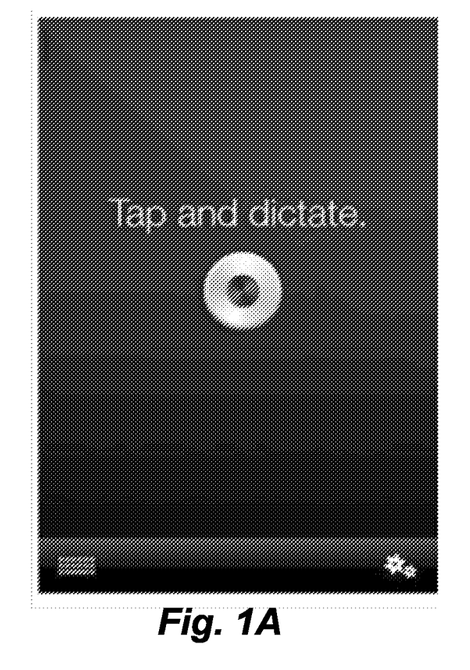
Figure 1B:
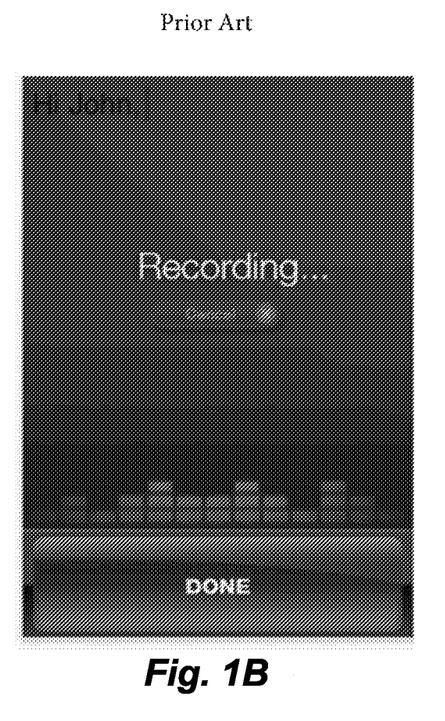
Figure 1C:
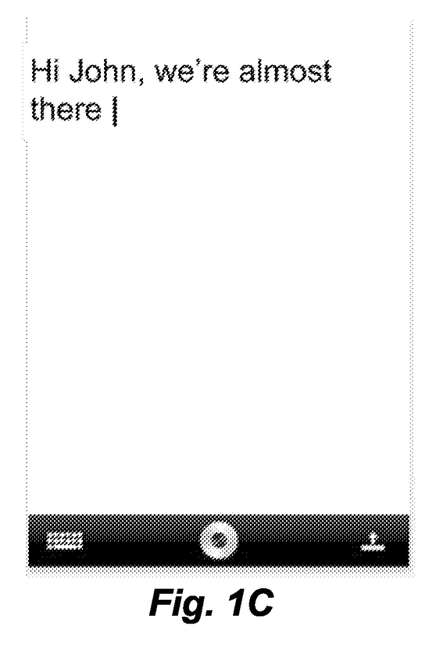

U.S. Patent Publication 20110054899 describes a hybrid client-server ASR arrangement for a mobile device in which speech recognition may be performed locally by the device and/or remotely by a remote ASR server depending on one or more criteria such as time, policy, confidence score, network availability, and the like. An example screen shot of the initial prompt interface from one such mobile device ASR application, Dragon Dictation™ for iPhone™, is shown in FIG. 1A which processes unprompted speech inputs and produces representative text output. FIG. 1B shows a screen shot of the recording interface for Dragon Dictation™ for iPhone™. FIG. 1C shows an example screen shot of the results interface produced for the ASR results by Dragon Dictation™ for iPhone™.

Figure 2A:
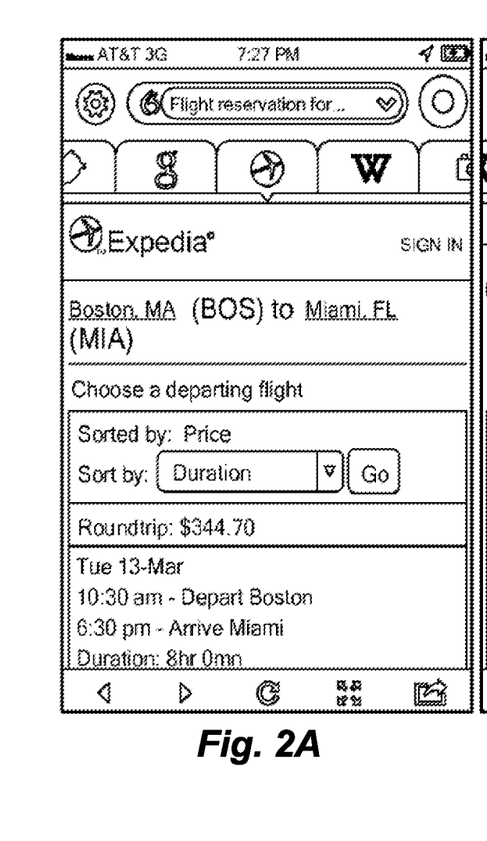
Figure 2B:
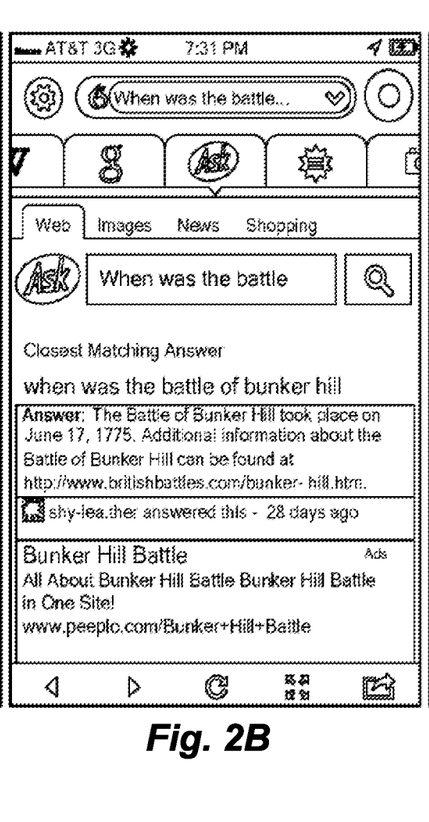
Figure 2C:
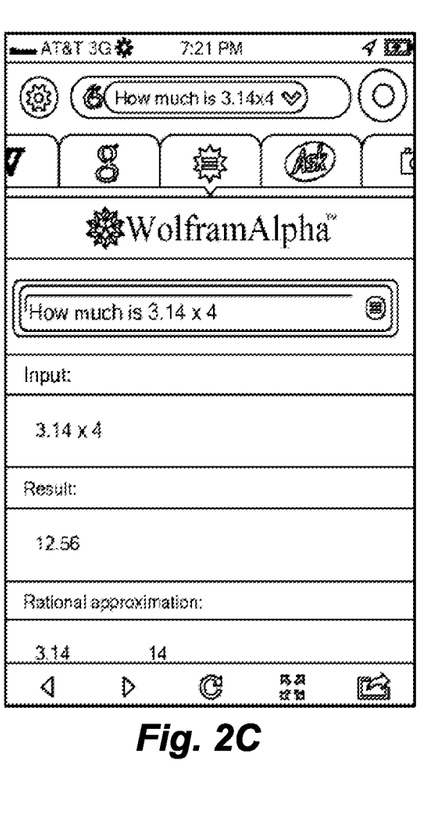

FIG. 2 A-C shows some example screen shots of another mobile device application, Dragon Mobile Assistant™, which processes speech query inputs and obtains simultaneous search results from a variety of top websites and content sources. Such applications require adding a natural language understanding component to an existing web search algorithm in order to extract semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents). Currently, a dialog application such as Dragon Mobile Assistant™ can only handle one dialog task at a time. Once a dialog task is started, it must be finished or cancelled before another conversation can start. Performing two tasks that use the same objects means that anaphora need to be resolved, which is complicated for the user and on the server side. Also, it is impractical to make more than one task progress at the same time.

SUMMARY

Embodiments of the present invention are directed to an arrangement for conducting natural language dialogs with a user on a mobile device using automatic speech recognition (ASR) and multiple different dialog applications. A user interface provides for user interaction with the dialogue applications in natural language dialogs. An ASR engine processes unknown speech inputs from the user to produce corresponding speech recognition results. A dialog concept module develops dialog concept items from the speech recognition results and stores the dialog concept items and additional dialog information in a dialog concept database. A dialog processor accesses dialog concept database information and coordinates operation of the ASR engine and the dialog applications to conduct with the user a plurality of separate parallel natural language dialogs in the dialog applications.

The user interface may include multiple application selection tabs for user selection of a given active dialog application to interact with the user. The dialog concept items may include an indication of the dialog application in which they were originated. In a specific embodiment, there may be a domain expert agent for each dialog application to coordinate with the dialog processor to conduct a natural language dialog with the user in the associated dialog application. The dialog processor may push relevant dialog concept database information to the dialog applications and/or the dialog applications may pull relevant information from the dialog concept database.

BRIEF DESCRIPTION OF THE DRAWINGS

FIG. 1 A-C shows various example screen shots from a hybrid ASR application for a mobile device.

FIG. 2 A-C shows various example screens in a mobile device dialog application.

FIG. 6 A-F shows screen captures of a user interface in an example use case.

DETAILED DESCRIPTION

Figure 3:
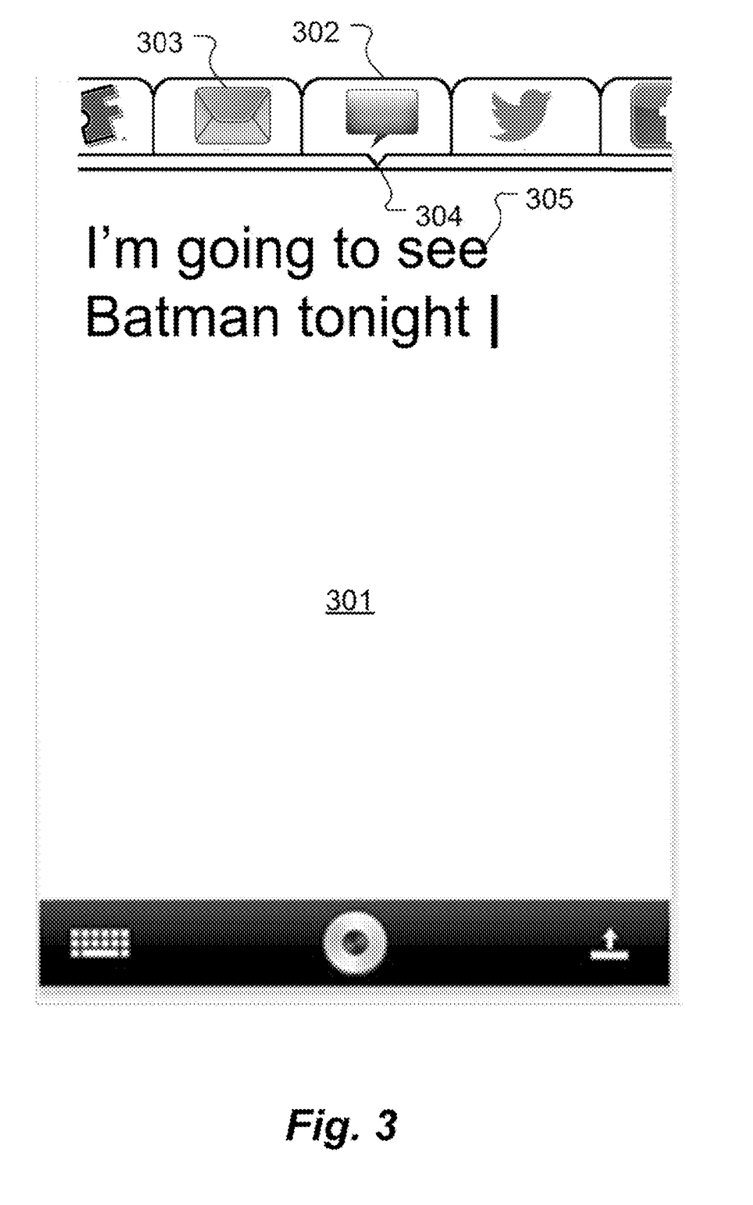
FIG. 3 shows an example screen shot of a user interface for a mobile device according to an embodiment of the present invention.

Embodiments of the present invention are directed to an arrangement for conducting natural language dialogs with a user on a mobile device using automatic speech recognition (ASR) and multiple different dialog applications. For example, FIG. 3 shows an interactive display 301 for a mobile device with multiple user selectable tabs 302 which each correspond to one dialog thread being handled by one application agency. In this context, an agent can be thought of as a natural language module that acts on behalf of a given end application to interact with the user via the mobile device interface. An agent can itself be composed of a set of agents. Each agency is fed the natural language N-best list results and takes whatever information it can digest. Each piece of information can be kept as an atomic semantic object that registers the source (the "tab") it came from. These can be added to a global concept cloud that can be shared across agencies. (For example, see U.S. patent application Ser. No. 13/855,117, filed Apr. 2, 2013 and incorporated herein by reference.) It should be understood that embodiments of the present invention are not limited to what is specifically shown in the enclosed figures, and that there can be many different dialog interactions across many different end applications.

Figure 4:
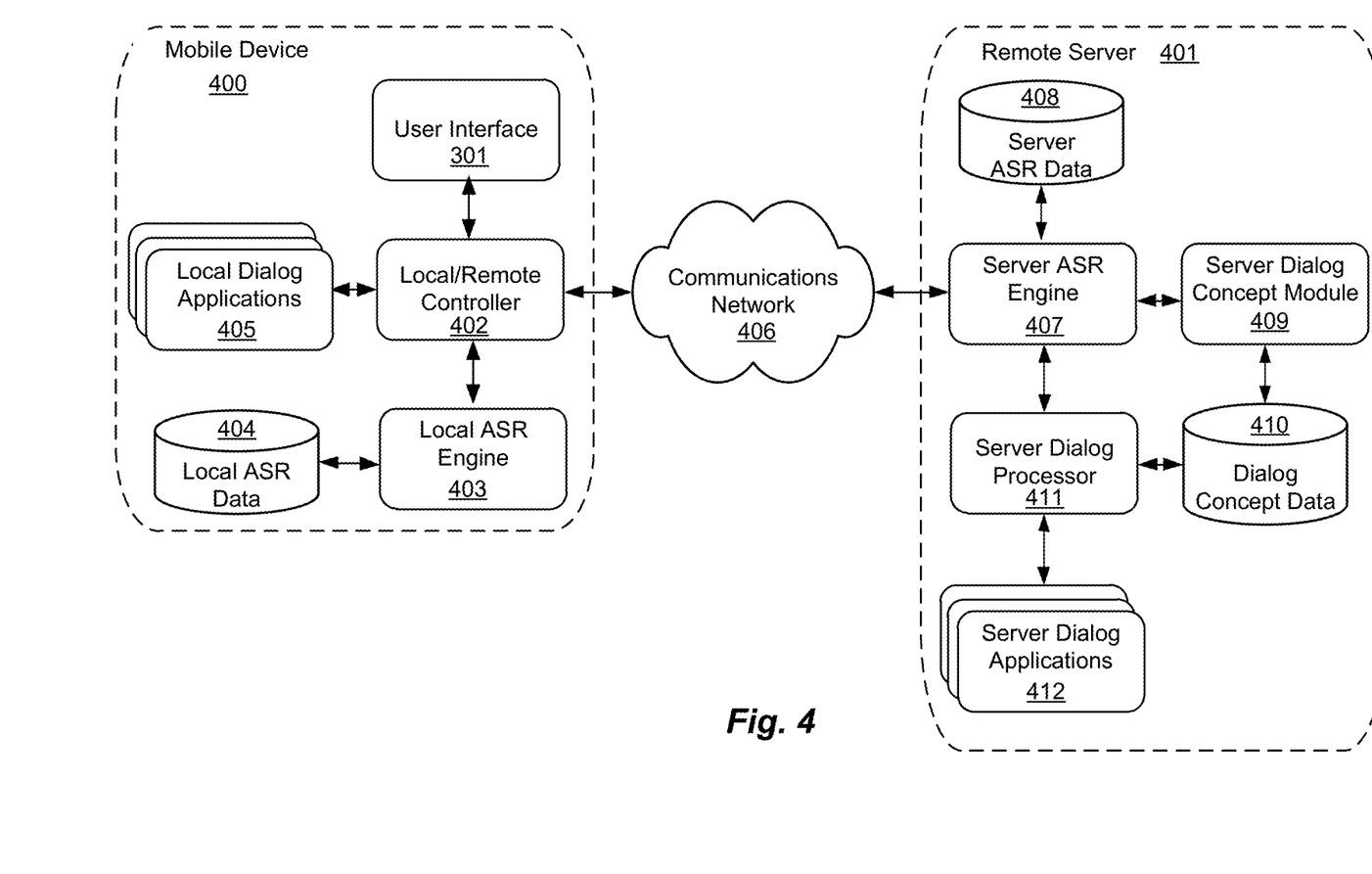
FIG. 4 shows various system elements in a multiple parallel dialog application arrangement according to an embodiment of the present invention.
Figure 5:
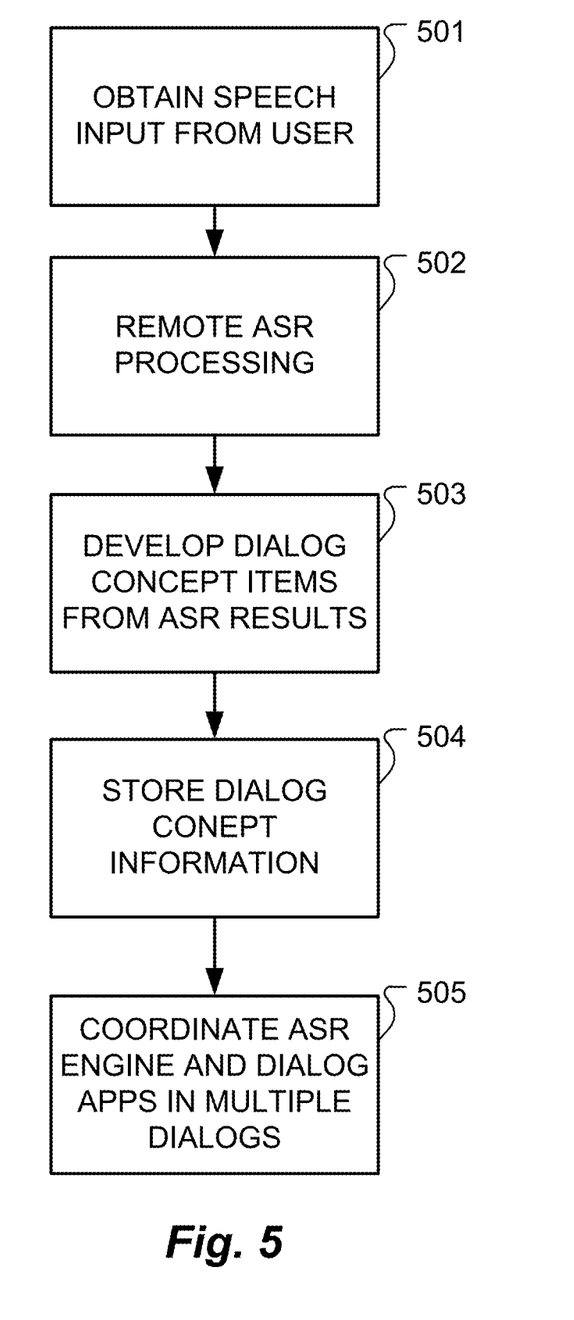
FIG. 5 shows functional steps in a multiple parallel dialog application arrangement according to an embodiment of the present invention.

FIG. 4 shows various elements and FIG. 5 shows various functional steps in a hybrid ASR arrangement according to an embodiment of the present invention. A mobile device 400 arrangement conducts multiple parallel natural language dialogs with a user via a user interface 301 and multiple different dialog applications using automatic speech recognition (ASR) and associated local dialog data. The user interface 301 has multiple application selection tabs 302 for user selection of a given active dialog application 304 to interact with the user in a natural language dialog. In the specific embodiment shown in FIG. 4, the multiple different dialog applications include local dialog applications 405 on the mobile device 400 and also remote server dialog applications 412 on a remote server 401.

Unknown speech inputs from the user for the given active dialog application 304 are received via the user interface 301, step 501, and processed by an ASR arrangement processes to produce corresponding speech recognition results 305, step 502. In the specific embodiment shown in FIG. 4, a local/remote controller 402 may direct the speech input to a local ASR engine 403 within the mobile device 400 that performs speech recognition using local ASR data 404. In addition or alternatively, the local/remote controller 402 may send the speech signal over a wireless communications network 406 to a remote server 401 having a server ASR engine 407 and server ASR data 408 that performs the speech recognition of the speech input.

A dialog concept module 409 develops dialog concept items from the speech recognition results and stores them along with additional dialog information (such as an indication of the dialog application in which they were originated) in a dialog concept database 410, step 503. A dialog processor 411 accesses dialog concept database information in the dialog concept database 410 and coordinates operation of the ASR engine 407 and multiple dialog applications 405 and/or 412 selected by the user via the application selection tabs 302 on the user interface 301, step 504, to conduct multiple separate parallel natural language dialogs with the user, step 505. The dialog processor 411 may use a domain expert agent for each dialog application 405 and/or 412 to conduct a natural language dialog with the user in a given associated dialog application. The dialog processor 411 may push relevant dialog concept database information 410 to the dialog applications 405 and/or 412 and/or the dialog applications 405 and/or 412 may pull relevant information from the dialog concept database 410.

In the specific embodiment shown in FIG. 4, the dialog processor 411 and dialog concept module 409 and associated dialog concept data 410 are processed by a remote server 401 in a client server arrangement where the mobile device 400 is the local client. In other embodiments where the mobile device 400 has sufficient processing resources, some or all of these functionalities may be performed wholly or in part on the local mobile device 400. That is, depending on the specific circumstances and resources available any or all of the processing functionality may be performed in whole or in part either locally and/or remotely.

FIG. 6 A-F shows screen captures of a user interface 601 in an example use case. In this example, the user initially starts the application and says: "Send a message to John: I'm going to see Batman tonight." As shown in FIG. 6A, the tab-layout 602 appears on the user interface 601 with the SMS composition tab 603 in the center position, Email composition tab 606 on the left, maps application tab 605 on the right, weather application tab 607 on the far right and so on. Each domain-expert tab initially will grab the pertinent information it can use for the first shot interaction. Then while the user edits the recognized text 604 to be sent (by speech dialog interaction or text), any extra parsed content during this further interaction also is sent to the other domain-expert agencies. If the user completes the message saying: "I'll go grab Bob in Boston and then I'll join you," as shown in FIG. 6B, then "Boston" can be seen as a location for a map search, "Bob" can be identified as a contact for some social media websites, and the full text is also appended to the social media "posts" that are prepared in the social media tabs. So if the user next asks "What's the traffic now?" as shown in FIG. 6C, the system switches to the maps application tab 605 and uses "Boston" from the previous interaction as the locus for the map search and switches the display in the user interface 601 one tab to the right to the maps application tab 605 populated with current traffic information. FIG. 6D. If the user then continues interactions adding more content to another application, the user interface 601 displays each block of collected recognition text 604 with an icon identifying which application tab was used (see FIG. 6C). The user can delete any such text block by swiping it out of the user interface display 601.

The applications that can't use the specific information collected as the conversation goes on will grey themselves out in the tab-layout 602. For example, once the concept "Boston" has been registered in FIG. 6B, the user could speak to the corresponding tab for that concept and as in FIG. 6C: "What's the traffic now?" That specific query would be determined by NLU and dialog processing to be irrelevant to all other tabs (such as SMS, email, etc.) and so should not show up in them.

Figure 6A:
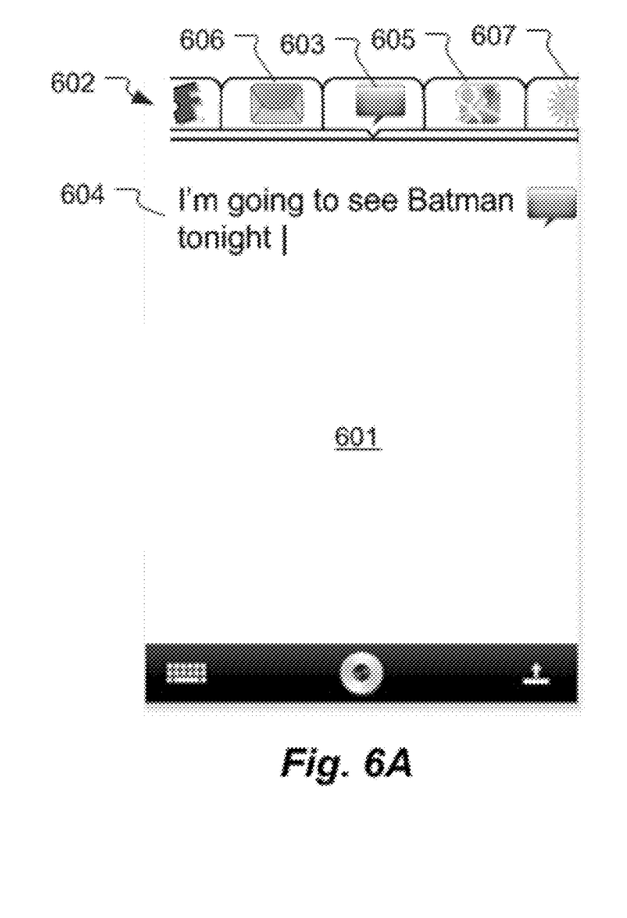
Figure 6B:
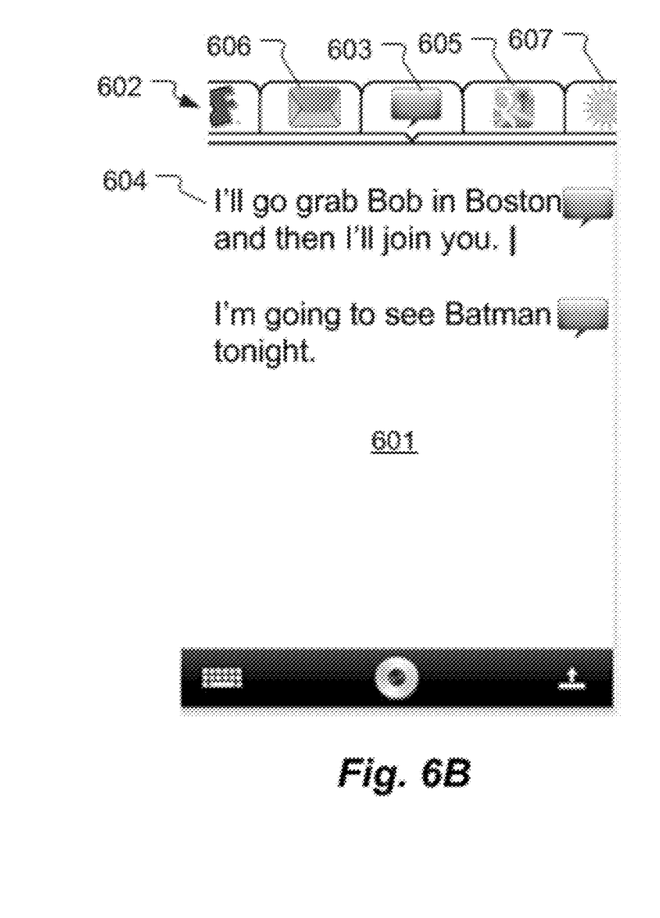
Figure 6C:
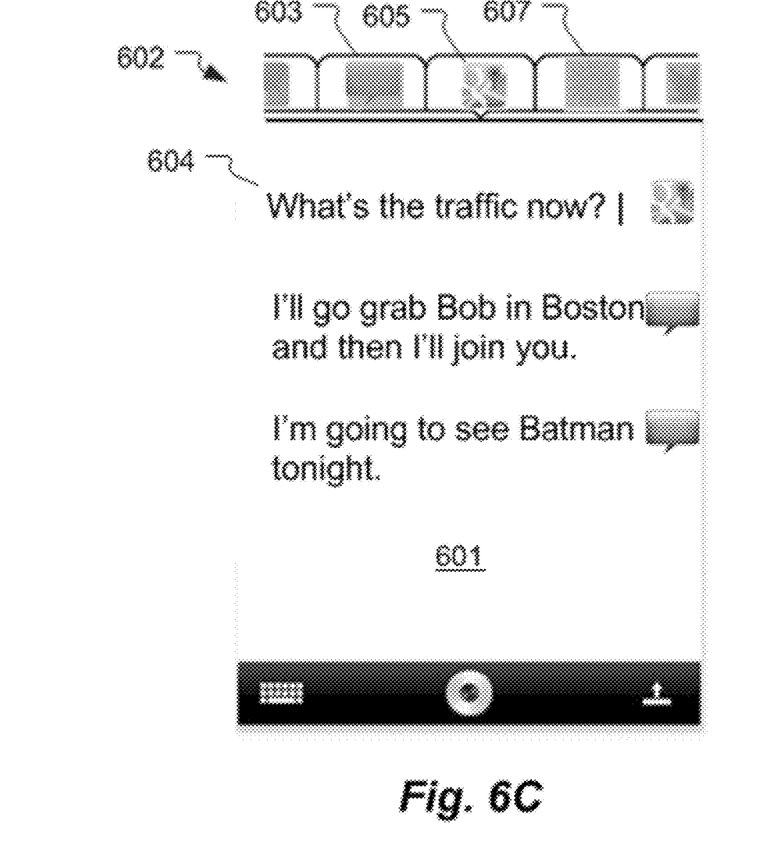
Figure 6D:
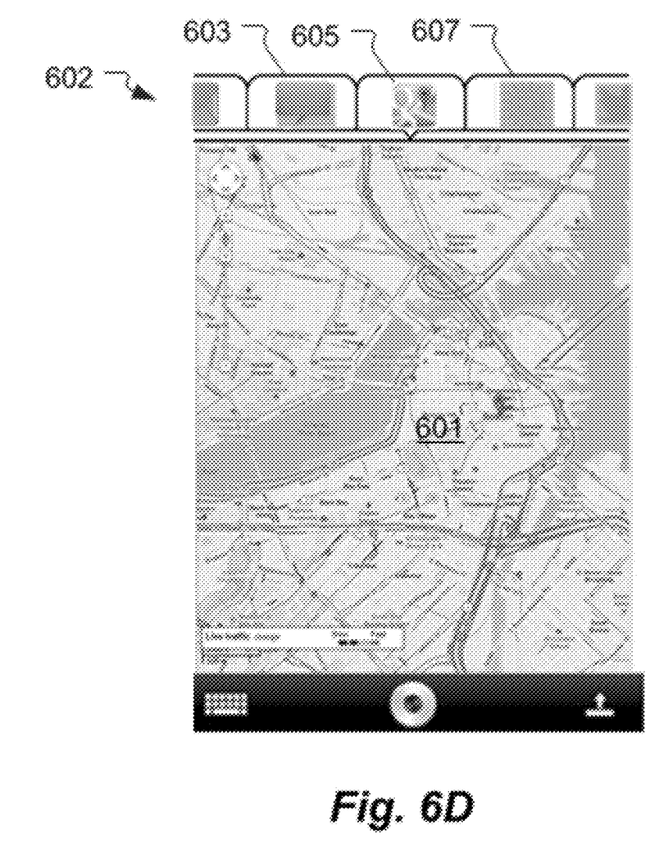
Figure 6E:
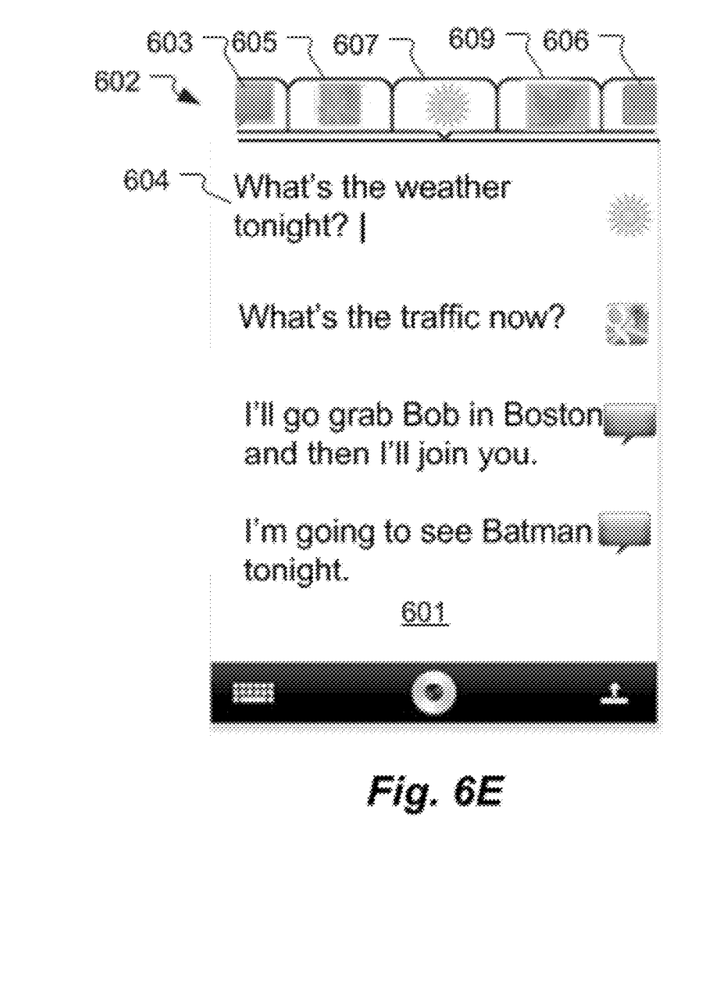
Figure 6F:
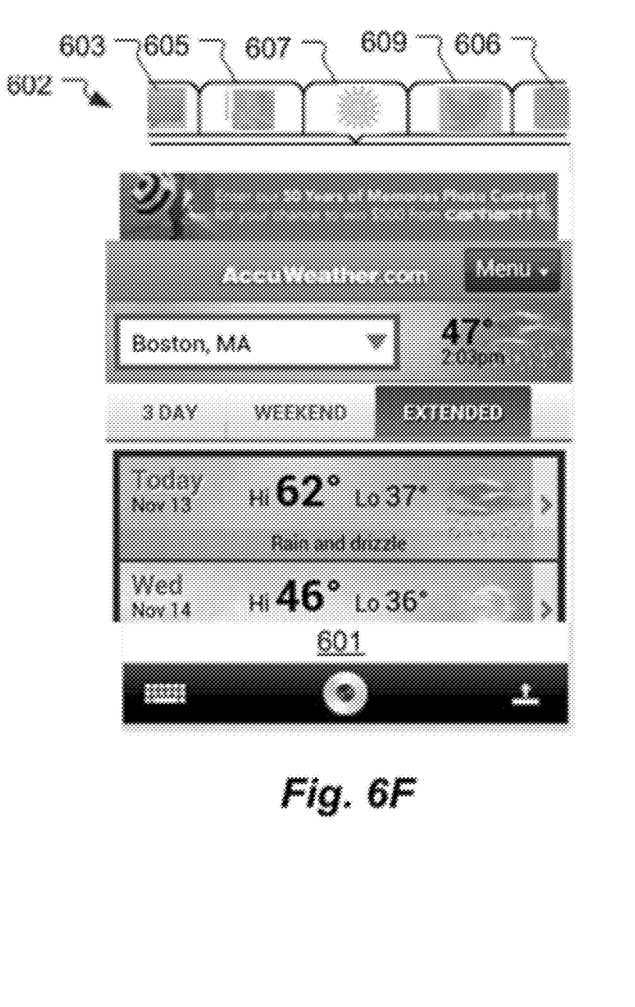

If the user would like to bring a tab that was not activated from the beginning, he can do a long press on the tab-layout 602 and would see a popup listing all the available agencies. He could then activate a specific domain-expert agency who would receive all information from previous interactions. Some tabs could compute values and inject them into a concept cloud for use by other domain experts or other applications. For example, if the user requests: "What is the weather tonight?" in FIG. 6E, then using the information from the previous interactions, the new weather concept already has a date (tonight) and a location (Boston) and so the weather application tab 607 displays in the user interface 601 weather information based on those existing concepts and information, FIG. 6F.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
   receiving first audio speech input and second audio speech input;
   determining, based on first recognized text corresponding to the first audio speech input, a first application;
   determining, based on the first recognized text corresponding to the first audio speech input and based on second recognized text corresponding to the second audio speech input, a second application;
   configuring, by a computing device that is displaying a user interface, the user interface, wherein the user interface is configured to display the first recognized text adjacent an indicator of the first application corresponding to the first recognized text and the second recognized text adjacent an indicator of the second application corresponding to the first recognized text and the second recognized text;
   receiving, based on a user interaction with the user interface, a selection of the indicator of the second application; and
   providing, to the second application, data, wherein the data is based on both the first recognized text and the second recognized text, wherein the second application displays information on the user interface based on the data from both the first recognized text and the second recognized text, and wherein the first recognized text is received from a different utterance than the second recognized text.

2. The method of claim 1, wherein the first application comprises a text messaging application, an email application, a social media application, a weather application, or a map application.

3. The method of claim 1, further comprising causing display of a listing of applications.

4. The method of claim 3, wherein the user interaction with the user interface comprises touch input corresponding to the indicator of the first application.

5. The method of claim 1, further comprising:
determining, based on the second recognized text, a dialog concept; and
storing, in a dialog concept database, the dialog concept.

6. The method of claim 5, wherein providing the data comprises providing, from the dialog concept database and to the first application, the dialog concept.

7. The method of claim 1, wherein the indicator of the first application comprises an icon.

8. The method of claim 1, further comprising:
initiating a natural language dialog process associated with a user, wherein receiving the first audio speech input and receiving the second audio speech input are performed as part of the natural language dialog process.

9. A method comprising:
receiving first audio speech input and second audio speech input;
determining, based on first recognized text corresponding to the first audio speech input, a first application;
determining, based on the first recognized text corresponding to the first audio speech input and based on second recognized text corresponding to the second audio speech input, a second application;
configuring, by a computing device that is displaying a user interface, the first user interface, wherein the first user interface is configured to display the first recognized text adjacent an indicator of the first application corresponding to the first recognized text and the second recognized text adjacent an indicator of the second application corresponding to the first recognized text and the second recognized text;
receiving, based on a user interaction with the user interface, a selection of the indicator of the second application; and
causing display, based on the selection of the second application and based on both the first recognized text and the second recognized text, of the user interface that is associated with the second application, wherein the first user interface displays information based on both the first recognized text and the second recognized text, and wherein the first recognized text is received from a different utterance than the second recognized text.

10. The method of claim 9, wherein the first application comprises a text messaging application, an email application, a social media application, a weather application, or a map application.

11. The method of claim 9, further comprising causing display of a listing of applications.

12. The method of claim 11, wherein the user interaction with the first user interface comprises touch input corresponding to the indicator of the first application.

13. The method of claim 9, further comprising:
determining, based on the second recognized text, a dialog concept;
storing, in a dialog concept database, the dialog concept; and
providing, from the dialog concept database and to the first application, the dialog concept, wherein the first user interface comprises an indicator of the dialog concept.

14. The method of claim 9, wherein the indicator of the first application comprises a first icon.

15. A method comprising:
receiving first audio speech input and second audio speech input;
determining, based on first recognized text corresponding to the first audio speech input, a first application;
determining, based on the recognized text corresponding to the first audio speech input and based on second recognized text corresponding to the second audio speech input, a second application;
configuring, by a computing device that is displaying a user interface, a tab of the user interface, the tab of the user interface configured to display the first recognized text adjacent an indicator of the first application corresponding to the first recognized text and the second recognized text adjacent an indicator of the second application corresponding to the first recognized text and the second recognized text;
receiving, based on a user interaction with the user interface, a selection of the indicator of the second application; and
causing display, based on the selection of the second application and based on both the first recognized text and the second recognized text, of the first tab of the user interface, wherein the first tab is associated with the second application, and wherein the user interface displays information based on both the first recognized text and the second recognized text, and wherein the first recognized text is received from a different utterance than the second recognized text.

16. The method of claim 15, further comprising causing display of a listing of applications.

17. The method of claim 16, wherein the user interaction with the user interface comprises touch input corresponding to the indicator of the second application.

18. The method of claim 15, further comprising:
determining, based on the second recognized text, a dialog concept; and
storing, in a dialog concept database, the dialog concept.

19. The method of claim 18, further comprising providing, to the second application and based on the selection of the second application, the dialog concept.

20. The method of claim 15, further comprising:
initiating a natural language dialog process associated with a user, wherein receiving the first audio speech input and receiving the second audio speech input are performed as part of the natural language dialog.

* * * * *